United States Patent
Winn

[11] Patent Number: 6,133,730
[45] Date of Patent: Oct. 17, 2000

[54] APPARATUS FOR POSITIONING A DETECTION DEVICE FOR MONITORING A ROTATABLE MACHINE ELEMENT

[76] Inventor: William E. Winn, P.O. Box 2696, Edgewood, N. Mex. 87015-2696

[21] Appl. No.: 09/064,865

[22] Filed: Apr. 22, 1998

[51] Int. Cl.⁷ ..................................................... G01P 3/48
[52] U.S. Cl. ............... 324/207.22; 324/173; 324/207.25
[58] Field of Search .......................... 324/207.22, 207.11, 324/207.13, 207.14, 207.15, 207.21, 207.25, 207.26, 173

[56] References Cited

U.S. PATENT DOCUMENTS

| | | | |
|---|---|---|---|
| 2,333,210 | 11/1943 | Stern | 177/311 |
| 2,723,322 | 11/1955 | McLarn | 200/80 |
| 2,993,147 | 7/1961 | Wright, Jr. et al. | 317/21 |
| 3,365,614 | 1/1968 | Luongo et al. | |
| 3,470,385 | 9/1969 | Emmerich | 250/231 |
| 3,559,064 | 1/1971 | Grundy | 324/173 |
| 3,745,461 | 7/1973 | Wakamatsu et al. | 324/174 |
| 4,157,482 | 6/1979 | Kakinuma | 310/155 |
| 4,692,754 | 9/1987 | Edejer et al. | 340/671 |
| 4,728,942 | 3/1988 | England | 340/679 |
| 5,248,939 | 9/1993 | Brauer | 324/174 |
| 5,764,055 | 6/1998 | Kawase | 324/249 |
| 5,942,890 | 8/1999 | Reicks et al. | 324/174 |
| 5,982,171 | 11/1999 | Umemoto et al. | 324/207.21 |

Primary Examiner—Christine K. Oda
Assistant Examiner—Anthony Jolly
Attorney, Agent, or Firm—Ray R. Regan

[57] ABSTRACT

An apparatus for positioning a detection device for monitoring a rotatable machine element. The apparatus for positioning a detection device for monitoring a rotatable machine element includes a rod having one end removably mountable on the rotatable machine element. A plate is securable to the rod. A bearing assembly is engagable with the rod. A carriage is attachable to the bearing assembly for holding the detection device adjacent the plate for monitoring rotation of the rotatable base piece.

20 Claims, 4 Drawing Sheets

APPARATUS FOR POSITIONING A DETECTION DEVICE FOR MONITORING A ROTATABLE MACHINE ELEMENT

CROSS-REFERENCE TO RELATED APPLICATION

None.

FEDERALLY SPONSORED RESEARCH AND DEVELOPMENT

None.

FIELD OF THE INVENTION

The present invention pertains generally to the field of detection devices sensors. More particularly, the present invention pertains to an an apparatus for solving the problem of positioning a detection device for monitoring a rotatable machine element. The present invention is particularly, but not exclusively, useful for positioning a sensor for monitoring a rotatable machine shaft.

BACKGROUND OF THE INVENTION

A wide variety of detection devices, including but not limited to sensors, have been developed and manufactured for a diverse number of applications. The term "sensor" is but one example of the general term, "detection devices." Detection devices in the nature of sensors are used to locate, monitor and detect the presence both of matter and energy (the energy including but not limited to sound, light, radio and radar waves). As is known to those of skill in the art, some sensors also are called "switches," referring not only to devices for opening and closing electrical circuits, but also to electronic circuits for switching between two independent inputs. Switches may also be referred to as "motion" switches and "zero speed" switches.

Sensors are widely used in industry. Sensors are used, for example, to monitor and verify starting, operation, and stopping of machines, machine elements, and machine components. Uses for sensors include monitoring machines to anticipate over-loading, and protection against jamming of interrelated machine components and elements. Sensors also frequently are used to monitor speed, velocity, acceleration, and deceleration of machine elements, including reciprocating, rotating and rotatable gears, shafts, and cooperatively rotating and linearly moving systems like conveyors, fans, tachometers, counting systems, alarms, and other machines and machine elements.

A widely used form of sensor is the proximity sensor, or proximity switch. Proximity sensors are used in situations requiring fast, maintenance-free, wear resistant detection of objects, often in automation processes. Proximity sensors are available in at least two forms, inductive proximity sensors, and capacitive proximity sensors. Without physical contact between a sensor and an object to be detected, and independent of form, inductive proximity switches are available to detect all ferrous and non-ferrous metallic objects within an active zone of a proximity sensor. Capacitive proximity sensors may detect nonmetallic substances such as water, glass, plastics, paper, wood, and other substances.

Proximity sensors are useful because they require no physical contact with a moving or rotating machine element to perform the sensors' monitoring functions. As is now well known in the art, many inductive proximity sensors operate on the principle of an Eddy-current damped oscillator. For example, an oscillator circuit coil, with ferrite in the coil, may generate an electromagnetic field, often referred to as an "active zone" of a proximity sensor. When a metallic object enters an active zone of a sensor, the electrical state of the oscillator may change, and oscillation may slow or stop. When a metallic object comes within a certain distance of a proximity switch, the metallic object causes a modification of the current consumption in a sensor. The modification is detected, often by a trigger circuit, which in turn modifies the output stage of the sensor. If a metallic object is removed from an active zone, the oscillator circuit oscillates again, and the initial state of the sensor is reestablished. The influence on the state of the oscillator is a function of both the distance between the metallic object and the sensor, and the material used to construct the metallic object intruding into the active zone of the sensor.

The principles on which capacitive proximity sensors operate are different due to the nonmetallic nature of objects which may intrude into the active zone of a capacitive sensor. Sensors also exist which are described as "Namur-type" proximity sensors, where "Namur" means "Normen-Arbeitsgemeinschaft für Mess- und Regeltechnic." Inductive and capacitive Namur-type proximity switches basically consist of an oscillator circuit without an amplifier.

All forms of proximity sensors, or switches, are useful in monitoring operation of machine elements because proximity sensors can perform the sensors' monitoring functions without requiring physical contact with the machine element being monitored. A proximity sensor need only be placed in a position adjacent the machine element to be monitored, and need not physically contact or touch the machine element, whether static, moving, reciprocating, or rotating. A proximity sensor will function by merely being adjacent to an object. Physical contact with the object is not necessary. Therefore, proximity sensors are used in a wide variety of applications to monitor operation of machine elements.

Machine elements to be monitored by one or more sensors may include individual components of machines. For example, in connection with a conveyor system, one or more machines may be used to cause the conveyor system to operate. The one or more machines may be equipped with reciprocable or rotatable or rotating machine elements such as shafts. An operator may want to monitor, for example, a rotatable or rotating shaft to assess operation of an individual machine or a machine system in which the machine is a component. As industry reliance on sensors has increased, reliance on human observation of machine elements has decreased. Further, many environments in which machines operate require substantially uninterrupted operation, day and night, without regard to weekends or holidays. Industry relies on sensors to monitor substantially continuous operation of machine elements.

Gravity, friction, velocity of rotation, and the consequent load forces applied to bearings, driven shafts, and other components of driving and driven machines (collectively, "machine elements") may contribute to wear, material fatigue and degradation of machine elements. Monitoring a machine element, such as a rotatable rotor, axle or shaft (collectively, "shaft"), therefore, becomes necessary to enable a user to detect not only reciprocating or rotating operation of the machine element, but also to determine whether and to what extend a machine element such as a shaft may be wearing, fatiguing, or degrading. High speed circular rotation of shafts mounted in bearings gives rise to a force toward the center known as centripetal force, a force which is reacted to by centrifugal reaction. Angular velocity and angular acceleration of machine elements subjected not only to high velocity but significant loads also induce gyroscopic effects on shafts spinning rapidly and under significant load about the geometric axis of the shaft. As is commonly known, when two forces act on a shaft, a torque is formed whose vector along the x-axis which will produce a rotation about the y-axis, known as "precession" having significant angular velocities. The gyroscopic effect and torque also contribute to inducing wear of shafts and bearings in which shafts are located. In any rotational or reciprocating machine where accelerations and velocities are present, unbalanced forces may lead to stresses and vibrations. Further, if the speed of a shaft or rotor is slowly increased from rest, there will be a speed where the deflection increases suddenly, a phenomenon known as "whirling." A shaft which is balanced will rotate around the center of gravity of the shaft. However, if the shaft rotates at an angular velocity, the shaft will deflect a distance from the center of gravity due to centripetal reaction. Rotation also may induce undamped free vibrations. All of these forces and phenomena may contribute to rapid and excessive wear among machine elements, particularly in machine elements subjected to high forces. Excessive and rapid degradation and wear of machine components, including machine elements such as rotating shafts, may cause significant down time, expensive delays in repair and replacement of machine elements, and delays in use of the systems of which the machine is a component, particularly when a machine's worn element must be identified, inspected, removed and replaced. Frequent replacement of machines and machine elements causes significant expense to the operator. Such delays, costs and expenses are compounded if the apparatus is located at a remote site, or is part of a system which is expected to operate substantially uninterruptedly.

Therefore, the importance of a detection device such as a sensor is significant. A problem, however, is properly locating or positioning a sensor in proximity to the moving or rotating machine element. An additional problem is relocating, or repositioning, sensors as machines and machine elements are moved to a new position on assembly lines, on conveyor systems, and in other operating environments. Relocation or repositioning of a machine or machine element may be slight, but may be frequently done to adjust the system in which the machine is a component for a new and possibly temporary application. There is a need to position a detection device, such as a sensor for monitoring operation of a machine element. There also is a need to reposition a detection device easily and quickly with assurance that a detection device will remain properly positioned to perform its detection and monitoring function after relocation.

A problem to be solved, therefore, is to position a detection device to monitor operation of a machine element. Another problem to be solved is to position a detection device, including any one of a variety of sensors, to enable the sensor to substantially continuously monitor a reciprocable or rotatable machine element including, but not limited to, a rotating machine shaft. Another problem to be solved is to position a detection device in the proximity of a rotatable or rotating machine element, such as a shaft, to enable a sensor to monitor the fact of rotation, or the speed of rotation, or the velocity of rotation, of a machine element from zero speed of rotation through any speed of rotation, although no human operator may be monitoring operation of the machine or the machine element, regardless of the time of day or night.

An additional problem to be solved includes providing an apparatus for positioning one or more detection devices, including one or more sensors, for monitoring rotation of a machine element in such a way that the apparatus may be easily and readily moved or relocated to satisfy changed applications, needs, or combinations of machines in which a machine element is located.

What also is needed is a variety of ways to provide a carriage for components of the apparatus, including, but not limited to, an open platform, a partially enclosed housing, or a substantially enclosed housing.

In light of the above, it is an object of the present invention to provide an apparatus for positioning a detection device for monitoring a rotatable machine element.

It is another object of the present invention to provide an apparatus for positioning a detection device for monitoring a reciprocable or rotatable machine element, including but not limited to, a shaft.

Yet another object of the present invention is to provide an apparatus for positioning a detection device for monitoring a rotatable machine element that locates or positions a sensor in proximity to the moving or rotating machine element.

An additional object of the present invention is to provide an apparatus for positioning a detection device for monitoring a rotatable machine element that can be easily and readily relocated and repositioned as a machine and machine elements are moved or relocated.

In addition, it is an object of the present invention to provide an apparatus for positioning a detection device for monitoring a rotatable machine element which itself may be repositioned and relocated from one machine element to another, and to do so easily and quickly, with assurance that the detection device will remain properly positioned to perform the detection and monitoring function of the detection device, including a sensor.

It is yet another object of the present invention to provide an apparatus for positioning a detection device for monitoring a rotatable machine element to enable the sensor to continuously monitor a rotatable and rotating machine element including, but not limited to, rotating machine shafts.

Another object of the present invention is to provide an apparatus for positioning a detection device for monitoring a rotatable machine element in the proximity of a rotatable or rotating machine element, such as a shaft, to enable any one of a variety of sensors to monitor the fact of rotation, or the speed of rotation, or the velocity of rotation, of a machine element from zero speed of rotation through any speed of rotation, although no human may be monitoring operation of the machine or the machine element, and regardless of the time of day or night.

An additional object of the present invention is to provide an apparatus for positioning a detection device for monitoring a rotatable machine element adjacent a device for monitoring rotation of a machine element in such a way that the apparatus may be easily and readily moved or relocated to satisfy changed applications, needs, and combinations of the machine in which the machine element is rotatable or rotating.

It is also an object of the present invention to provide an apparatus for positioning a detection device for monitoring a rotatable machine element which may include a variety of ways to provide a carriage for the components of the apparatus, including, but not limited to, an open platform, a partially enclosed housing, or a substantially fully enclosed housing.

It is also an object of the present invention to provide an apparatus for positioning a detection device for monitoring a rotatable machine element which can be connected or interconnected to a computer or microprocessor to enable an operator at a site remote from the detection device to receive information and data about operation of the apparatus and of the rotatable machine element.

Yet another object of the present invention is to provide an apparatus for positioning a detection device for monitoring a rotatable machine element, and a method for making the apparatus, which respectively are easy to use and to practice, and which are cost effective for their intended purposes.

These and other objects, features, and advantages of such an apparatus for positioning a detection device for monitoring a rotatable machine element will become apparent to those skilled in the art when read in conjunction with the accompanying following detailed description, drawing figures, and appended claims.

SUMMARY OF THE INVENTION

An apparatus for positioning a detection device for monitoring a rotatable machine element, according to the present invention, includes a rod. The rod has a proximal end and a distal end, and a peripheral surface between the proximal end and the distal end of the rod. The proximal end of the rod is mountable on the rotatable machine element. The proximal end of the rod also is formed to enable the rod to be removable from the machine element. In a preferred embodiment of the present invention, the proximal end of the rod is formed with threads. The distal end of the rod also may be formed with a recess for engagement by a tool such as an alien wrench for removably securing the apparatus to the rotable machine element.

A bore is formed in a protruding end of the rotatable machine member. The term "protruding end" of the rotatable machine element includes, for example, an end of a rotatable machine shaft protruding from a machine which, unless covered, may be exposed to view during operation of the machine. A protruding end of a rotatable machine element also has a plane substantially perpendicular to the axis of rotation of the rotatable machine element which is exposed during operation of the machine unless covered. The bore formed in a protruding end of the rotatable machine element may be formed in the protruding end of the rotatable machine element, through the plane at the end of the protruding end of the rotatable shaft, by any number of methods well known in the art. For example, the bore may be formed in a protruding end of the shaft by drilling using mechanical drills, lasers, or similar tools. Threads also may be formed in the bore using any number of methods and tools available to tap the bore. Neither the circumference, depth, nor other shape or dimension of the bore is material to the present invention. The circumference, depth, or other shape or dimension of the bore is substantially determined by the circumference, depth, or other shape or dimension of the proximal end of the rod to be inserted into the bore in the protruding end of the shaft. In a preferred embodiment of the present invention, the bore formed in the protruding end of the shaft is also formed with an inner wall within the bore. Threads are formed in the inner wall of the bore. The threads formed in the inner wall of the bore are engagable with the threads formed on the proximal end of the rod to mount the rod on the protruding end of the machine element, or shaft.

An apparatus for positioning a detection device for monitoring a rotatable machine element, according to the present invention, also includes a plate. The plate is formed with an anterior face and a posterior face. The plate also is formed with an edge between the anterior face and a posterior face. Further, the plate is formed to have a hole between the anterior face and the posterior face for inserting the rod through the plate. As will be apparent to one skilled in the art, neither the shape nor dimension of the hole is material to the present invention. The plate is securable to the rod.

Neither the shape nor configuration of the plate is material to the present invention. In a preferred embodiment of the present invention, the plate is shaped substantially like a bar, and the edge consists of the two ends of the bar shaped plate. In another embodiment of the present invention, the plate is substantially circular. In the embodiment of the plate that is substantially circular, one or more notches is formed in the edge between the anterior and posterior faces of the plate. The plate may be formed in any number of a variety of shapes and configurations as desired by the user.

In operation of the plate, as the rotatable shaft rotates in the machine, the plate secured to the rod rotates as the shaft rotates. As the shaft rotates, an edge of the plate passes within proximity of a detection device, such as a proximity sensor. As the one or more notches in the edge of a substantially circular plate passes the sensor, the portion of the edge in which one or more notches has not been formed passes through the active zone of a proximity sensor. As the two edges of a plate shaped like a bar passes the sensor, the end of the bar comprising the edge of the bar passes through the active zone of a proximity sensor. The sensor is able, therefore, to monitor operation of the shaft, including rotation.

An apparatus for positioning a detection device for monitoring a rotatable machine element, according to the present invention, also provides for the plate to be securable to the rod. In a preferred embodiment of the present invention, the plate is formed with a duct. The duct may be tubular or any other shape. The duct may be formed with first axial threads. A screw, in the form of a set screw, having second axial threads, is provided to engage the first axial threads of the duct. By engaging the set screw with the duct formed in the plate, and applying torsional pressure on the set screw, the plate may be secured to the rod.

An apparatus for positioning a detection device for monitoring a rotatable machine element, according to the present invention, also includes a bearing assembly. The bearing assembly is engagable with the peripheral surface of the rod. The bearing assembly, in a preferred embodiment of the present invention, includes a bearing. The bearing is insertable into and coactable with a hub. The hub is formed with one or more threaded chambers. An apparatus for positioning a detection device for monitoring a rotatable machine element, according to the present invention, also includes one or more threaded mounting bolts. The structure of the one or more threaded chambers, and the one or more threaded mounting bolts, may be used to attach the bearing assembly to a carriage that is also included in the present invention, and described subsequently. The bearing assembly may be disposed between the posterior face of the plate and the distal end of the rod for rotating the rod.

An apparatus for positioning a detection device for monitoring a rotatable machine element, according to the present invention, also includes a carriage. The carriage is attachable to the bearing assembly. The carriage is further attachable to the bearing assembly for holding a detection device such as a sensor adjacent the edge of the plate for monitoring rotation of the rotatable machine element. The carriage is further shaped to allow the electrical and energized end of the sensor to be attachable to a computer for remote monitoring of the operation of the machine and rotatable machine element of the machine. In one embodiment of the present invention, the carriage may be a frame. The frame may be a simple frame for carrying the sensor. Alternatively, the carriage may be a housing which partially encloses the components of the present invention and partially encloses a sensor. In yet another embodiment of the present invention, the carriage may substantially fully enclose the components of the present invention, while partially or fully enclosing a sensor.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Figure 1:
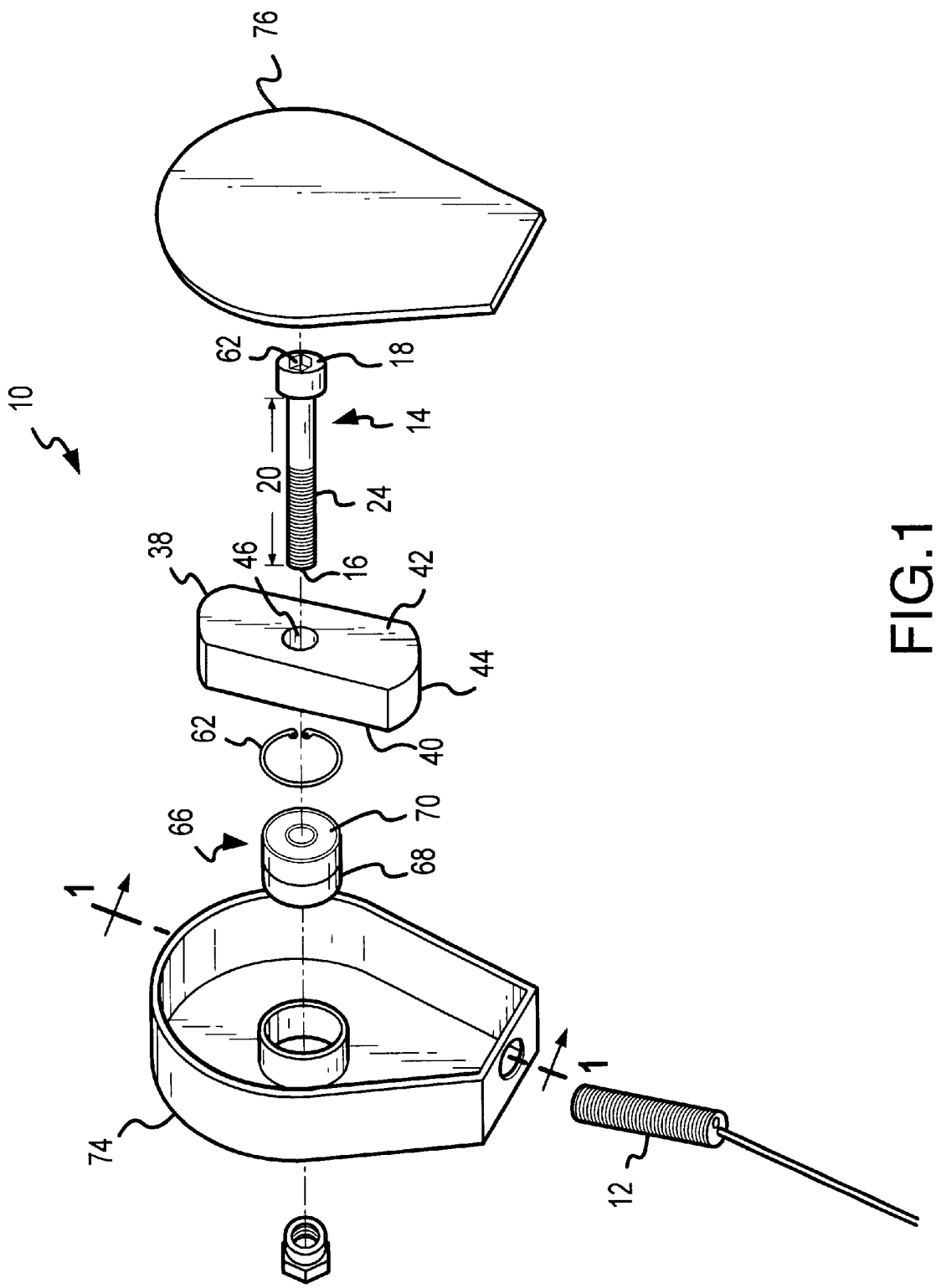
FIG. 1 is an exploded perspective view of the apparatus for positioning a detection device for monitoring a rotatable machine element, according to the present invention, to illustrate the structure and cooperation of structure more clearly.

Referring initially to FIG. 1, an apparatus for positioning a detection device for monitoring a rotatable machine element, according to the present invention is shown and generally designated 10. As shown, the apparatus for positioning a detection device for monitoring a rotatable machine element, according to the present invention, shows a detection device 12. An apparatus for positioning a detection device for monitoring a rotatable machine element, according to the present invention, also includes a rod 14. Rod 14 is formed with a proximal end 16 and a distal end 18, and a peripheral surface 20 between proximal end 16 and distal end 18. Proximal end 16 of rod 18 is mountable on the rotatable machine element 22 as best shown by cross-reference between FIGS. 2 and 3. Proximal end 16 of rod 14 is formed to be removable from mounting in rotatable machine element 22. As shown by cross-reference among FIGS. 1, 2 and 3, in a preferred embodiment of the present invention, proximal end 16 of rod 14 is formed with threads 24.

Figure 2:
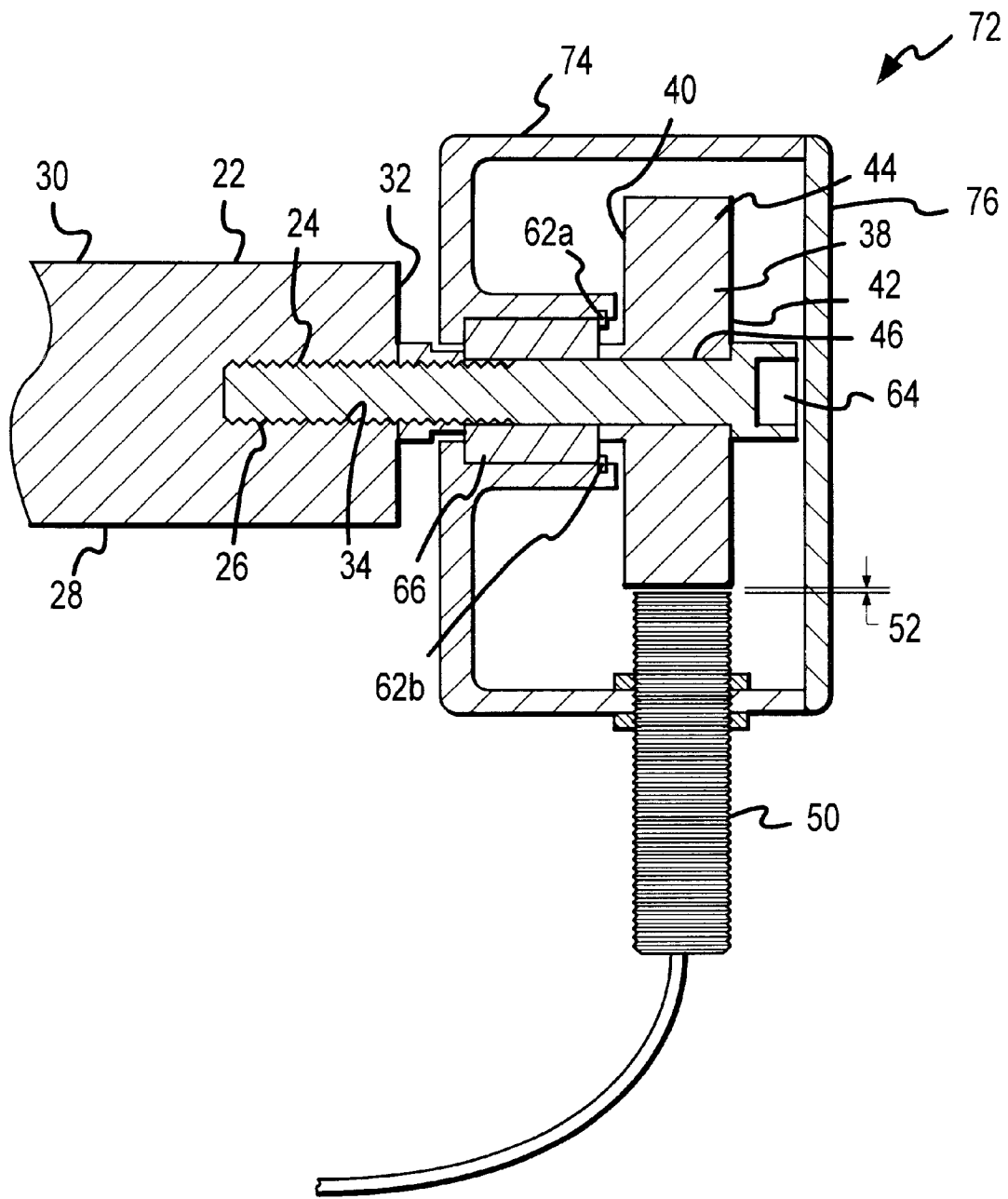
FIG. 2 is a side sectional view along the line 1—1 of FIG. 1 showing the present invention installed on an exposed end of a rotatable shaft of a machine.
Figure 3:
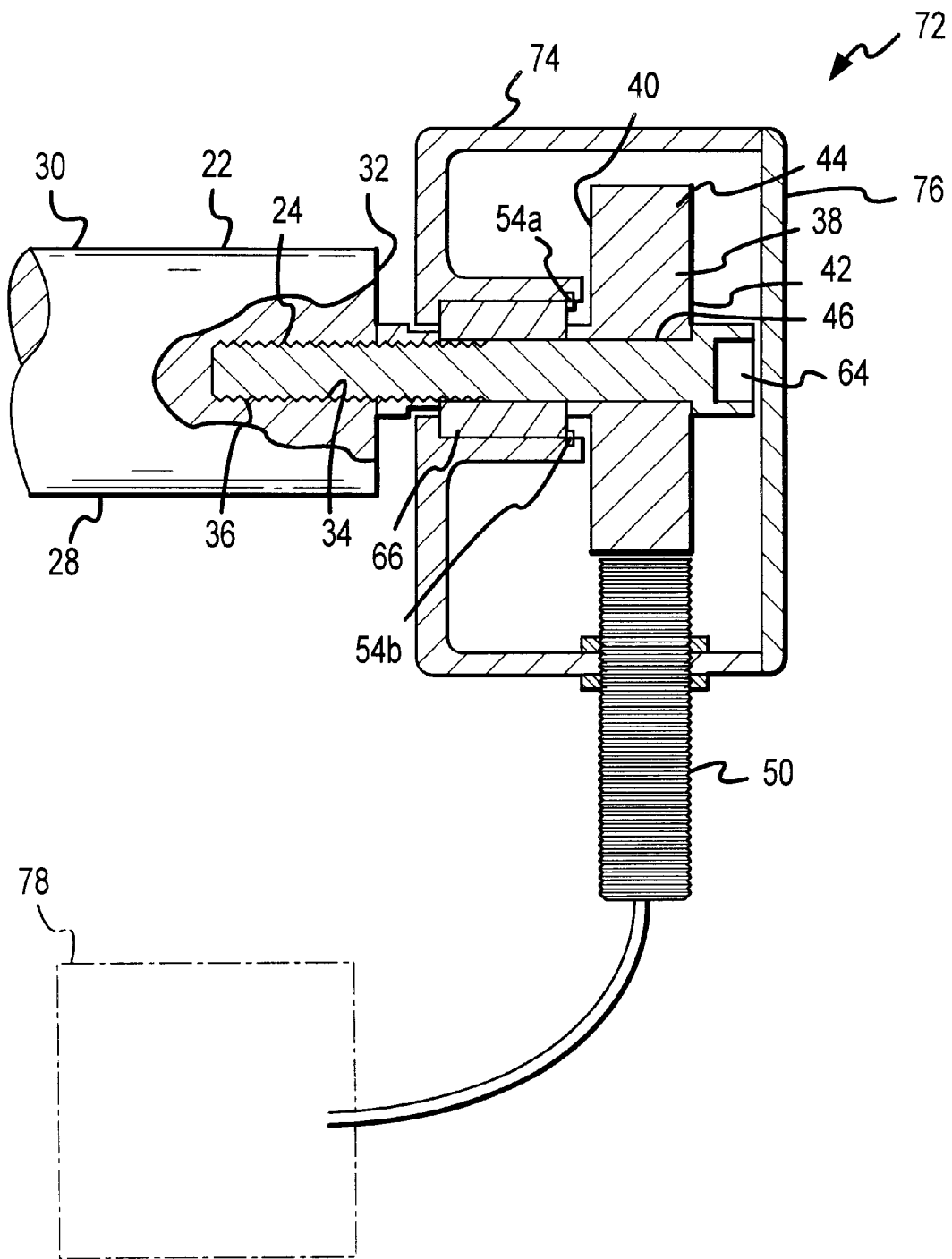
FIG. 3 is a cut away side sectional view along the line 1—1 of FIG. 1 of the present invention.

As further shown by cross-reference between FIGS. 2 and 3, a bore 26 is formed in a protruding end 28 of rotatable machine element 22. The term "protruding end" 28 of rotatable machine element 22 includes, for example, as shown in FIGS. 2 and 3, a protruding end 22 of a shaft 30. Protruding end 28 of shaft 30 includes a plane 32 substantially perpendicular to and located at end 28 of rotatable machine element 22, and is exposed, unless covered, during operation of a machine (not shown) in which rotatable machine element 22 operates.

Bore 26 in shaft 30 may be formed in protruding end 28 of shaft 30 by any number of ways well known in the art. For example, bore 26 may be formed in a protruding end 28 of shaft 30 by drilling using mechanical drills, lasers, or similar tools. Neither the circumference, depth, nor other shape or dimension of bore 26 is material to the present invention. The circumference, depth, or other shape or dimension of bore 26 is substantially determined by the circumference, depth, or other shape or dimension of proximal end 16 of rod 14 to be inserted into bore 26 in protruding end 28 of shaft 30. As shown in FIGS. 2 and 3, in a preferred embodiment of the present invention, bore 26 formed in protruding end 28 of shaft 30 is also formed with an inner wall 34 within bore 26. Bore threads 36 are formed in inner wall 34 of bore 26. As further shown in FIG. 3, bore threads 36 formed in inner wall 34 of bore 26 are engagable with threads 24 formed on proximal end 16 of rod 14 to allow proximal end 16 of rod 14 to be mounted on protruding end 28 of shaft 30.

As shown in FIG. 1, an apparatus for positioning a detection device for monitoring a rotatable machine element, according to the present invention, also includes a plate 38. As also shown by cross-reference between FIGS. 2 and 3, plate 38 is formed with an anterior face 40 and a posterior face 42. Plate 38 also is shown to be formed with an edge 44 between anterior face 40 and posterior face 42. Further, as shown in FIG. 1 and by cross-reference between FIGS. 2 and 3, plate 38 is formed with a hole 46 between anterior face 40 and posterior face 42 for inserting rod 14 through plate 38. As will be apparent to one skilled in the art from a review of the accompanying drawing Figures, neither the shape nor dimension of hole 46 is material to the present invention.

Figure 4:
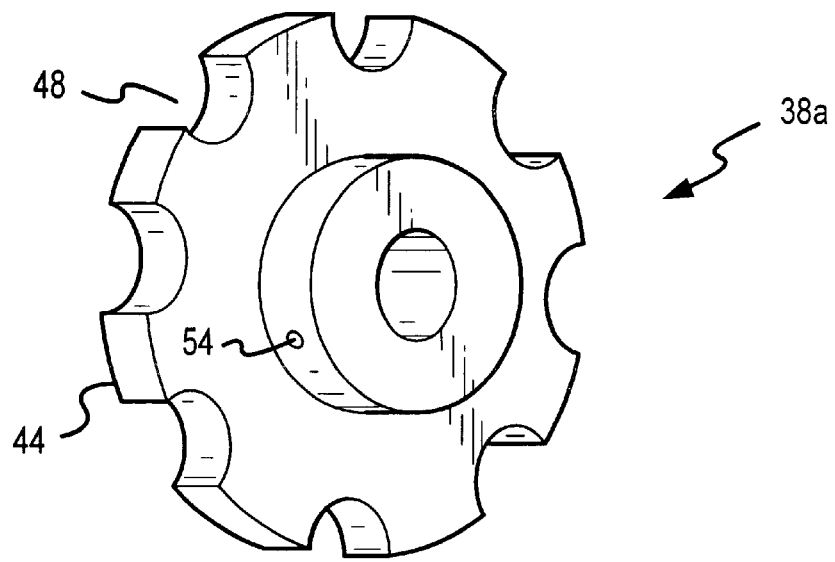
FIG. 4 is a perspective view of an alternative embodiment of the plate of the present invention.

In another embodiment of the present invention, plate 38 is substantially circular, as shown in FIG. 4. One or more notches 48 is formed in edge 44 of substantially circular plate 38a. In operation of the substantially circular embodiment of plate 38a, as rotatable shaft 30 rotates in a machine (not shown), plate 38a secured to rod 14 rotates as shaft 30 rotates. As shaft 30 rotates, edge 44 of plate 38a passes within the proximity of detection device 12, which is shown in FIGS. 2 and 3 to be a sensor 50. As the one or more notches 48 in edge 44 of plate 38 passes sensor 50, the portion of edge 44 extending above the one or more notches 48 passes through an active zone (shown diagrammatically in FIG. 2 as space 52) of proximity sensor 50. Sensor 50 is capable, therefore, of monitoring operation, including rotation, of shaft 30. As will be apparent to one skilled in the art, plate 38 may be substantially rectangular, square, triangular, or any geometric shape or form.

Figure 5:
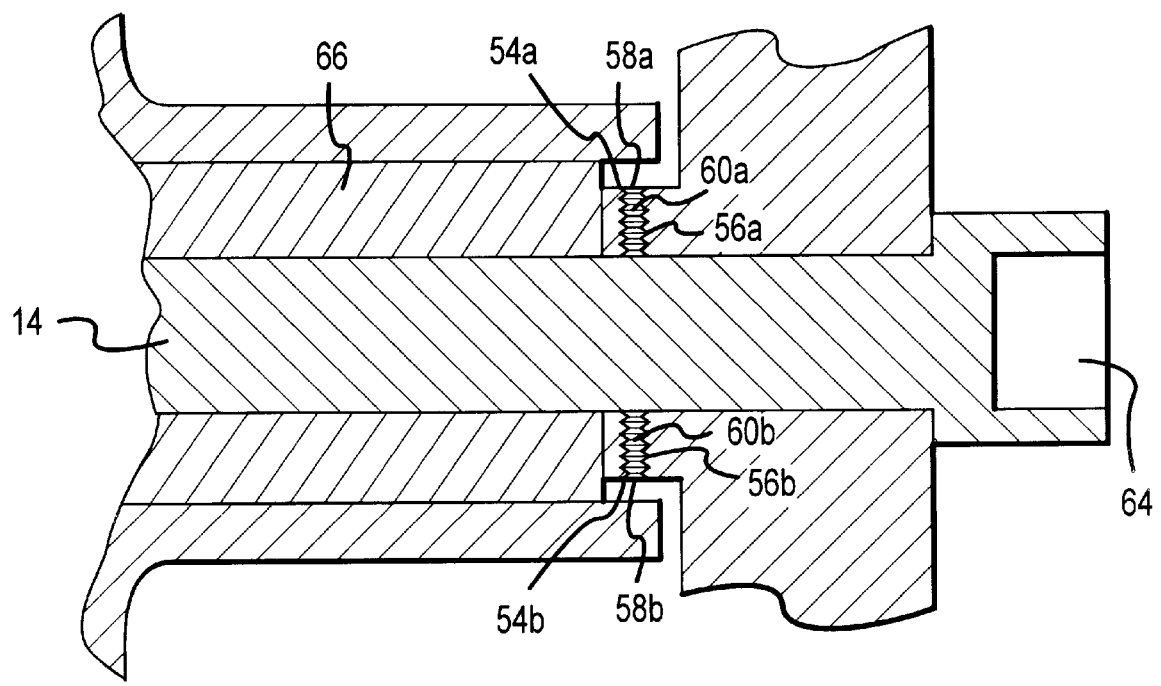
FIG. 5 is a side secitonal view along the line 1—1 of FIG. 1 showing an alternative embodiment of the present invention.

An apparatus for positioning a detection device for monitoring a rotatable machine element, according to the present invention, also provides for plate 38 to be securable to rod 14. As shown best in FIG. 5 of the accompanying drawing Figures, plate 38 may be formed with a duct 54. Duct 54 may be tubular or any other shape. Duct 54 is shown to be formed with first axial threads 56. A set screw 58, having second axial threads 60, is provided to engage first axial threads 56 of duct 54. By engaging set screw 58 with duct 54 formed in plate 38, and applying torsional pressure to set screw 58, plate 38 may be secured to rod 14. As will be apparent to those skilled in the art, plate 38 may be secured to rod 14 in any number of other ways, including, without limitation, soldering, crimping, and other securing means, including a retaining ring 62 shown in FIG. 1. As is also best shown by cross-reference between FIGS. 1 and 5, distal end 18 of rod 14 also may be formed with a recess 64 for engagement by a tool such as an alien wrench (not shown) for removably securing the present invention to a rotable machine element such as shaft 30.

An apparatus for positioning a detection device for monitoring a rotatable machine element, according to the present invention, also includes a bearing assembly 66, as shown best in FIG. 1, and also shown by cross-reference between FIGS. 2 and 3. As best shown in FIGS. 2 and 3, bearing assembly 66 is engagable with peripheral surface 20 of rod 14. As also shown in FIG. 1, bearing assembly 66, in a preferred embodiment of the present invention, includes a bearing 68. Bearing 68 is insertable into and coactable with a hub 70. Bearing assembly 66 may be disposed between posterior face 42 of plate 38 and distal end 18 of rod 14 to enable rotating rod 14 in bearing assembly 66.

As shown by cross-reference between FIGS. 1, 2 and 3, an apparatus for positioning a detection device for monitoring a rotatable machine element, according to the present invention, also includes carriage 72. In a preferred embodiment of the present invention, carriage 72 includes a case 74 and a cover 76. Case 74 is engageable with bearing assembly 66. Carriage 72 also is formed for holding detection device 12 such as sensor 50 adjacent edge 44 of plate 38 for monitoring rotation of rotatable machine element 22, which may be shaft 30. Cover 76 of carriage 72 may be connected to case 74 in any number of ways well known in the art, including one or more sets of nuts and bolts (not shown) connecting cover 76 to case 74. In another embodiment of the present invention, carriage 72 may consist solely of case 74. As will be evident to those skilled in the art, carriage 72 may consist of any number of configurations suitable for positioning a detection device 12 and mounting apparatus 10 on protruding end 28 of shaft 30.

As will be apparent to one skilled in the art, detection device 12 also may be connected or interconnected to a computer or microprocessor 78 shown in phantom in FIG. 3 to enable an operator at a site remote from detection device 12 to receive information and data about operation of machine in which shaft 30 is a component.

While the particular an apparatus for positioning a detection device for monitoring a rotatable machine element as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

What is claimed is:

1. An apparatus for positioning a detection device for monitoring a rotatable machine element, comprising:
   a rod having one end removably mountable on the rotatable machine element;
   a plate securable to the rod;
   a bearing assembly engageable with the rod; and
   a carriage slidably attachable to the bearing assembly for holding the detection device adjacent the plate for monitoring rotation of the rotatable machine element.

2. An apparatus for positioning a detection device for monitoring a rotatable machine element as defined in claim 1, wherein the rod is removably mountable to a protruding end of the rotatable machine element.

3. An apparatus for positioning a detection device for monitoring a rotatable machine element as defined in claim 2, wherein the rod is formed with a proximal end and a distal end, and a peripheral surface therebetween, the proximal end being removably mountable in the bore of the rotatable machine element.

4. An apparatus for positioning a detection device for monitoring a rotatable machine element as defined in claim 3, wherein the bore formed in the protruding end of the rotatable machine element further comprises bore threads.

5. An apparatus for positioning a detection device for monitoring a rotatable machine element as defined in claim 4, wherein the proximal end of the rod is formed with a second set of threads matable with the bore threads on the inner wall of the bore.

6. An apparatus for positioning a detection device for monitoring a rotatable machine element as defined in claim 5, wherein the detection device is a sensor.

7. An apparatus for positioning a detection device for monitoring a rotatable machine element as defined in claim 6, wherein the detection device is connectable to a computer for monitoring the rotatable machine element remotely.

8. An apparatus for positioning a detection device for monitoring a rotatable machine element, comprising:
   a rod having a proximal end and a distal end, and a peripheral surface therebetween, the proximal end formed to be removably mountable on the rotatable machine element;
   a plate formed with a hole for inserting the rod through the plate and securing the plate to the rod;
   a bearing assembly engageable with the peripheral surface of the rod; and
   a carriage slidably attachable to the bearing assembly for holding the detection device adjacent the plate for monitoring rotation of the rotatable machine element.

9. An apparatus for positioning a detection device for monitoring a rotatable machine element as defined in claim 8, wherein the proximal end of the rod is removably engagable with a bore formed in a protruding end of the rotatable machine element.

10. An apparatus for positioning a detection device for monitoring a rotatable machine element as defined in claim 8, wherein the plate is secured to the rod.

11. An apparatus for positioning a detection device for monitoring a rotatable machine element as defined in claim 8, wherein the bearing assembly further comprises a bearing and a hub.

12. An apparatus for positioning a detection device for monitoring a rotatable machine element, comprising:
   means for forming a bore in a protruding end of the rotatable machine element;
   a rod having a proximal end and a distal end, and a peripheral surface therebetween, the proximal end removably mountable in the bore of the rotatable machine element;
   a plate formed with an anterior face and a posterior face, and an edge formed therebetween, the plate having a hole between the anterior face and the posterior face for inserting the rod through the plate;
   means for securing the plate to the rod;
   a bearing assembly engageable with the peripheral surface of the rod and disposed between the posterior face of the plate and the distal end of the rod for rotating the rod; and
   a carriage slidably attachable to the bearing assembly for holding the detection device adjacent the rotating edge of the plate for monitoring rotation of the rotatable machine element.

13. An apparatus for positioning a detection device for monitoring a rotatable machine element as defined in claim 12, wherein the bore forming means is a drill.

14. An apparatus for positioning a detection device for monitoring a rotatable machine element as defined in claim 13, wherein the plate is a bar.

15. An apparatus for positioning a detection device for monitoring a rotatable machine element as defined in claim 13, wherein the edge of the plate is formed with one or more notches.

16. An apparatus for positioning a detection device for monitoring a rotatable machine element as defined in claim 12, wherein the carriage further comprises a case and a cover.

17. An apparatus for positioning a detection device for monitoring a rotatable machine element as defined in claim 12, wherein the carriage is a housing for enclosing the rod, the plate, the means for securing the plate to the rod, the bearing assembly, and the detection device.

18. An apparatus for positioning a detection device for monitoring a rotatable machine element as defined in claim 12, wherein the detection device is a sensor.

19. An apparatus for positioning a detection device for monitoring a rotatable machine element as defined in claim 18, wherein the detection device is a proximity sensor.

20. An apparatus for positioning a detection device for monitoring a rotatable machine element as defined in claim 12, wherein the detection device is connectable to a computer.

* * * * *